US010296168B2

(12) United States Patent
Kaehler et al.

(10) Patent No.: US 10,296,168 B2
(45) Date of Patent: May 21, 2019

(54) APPARATUS AND METHOD FOR A MULTI-STEP SELECTION INTERFACE

(71) Applicant: Northrop Grumman Systems Corporation, Falls Church, VA (US)

(72) Inventors: Adrian Kaehler, North Hollywood, CA (US); Shi-Ping Hsu, Pasadena, CA (US); Sam Leventer, W. Hollywood, CA (US); Fred Zyda, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 262 days.

(21) Appl. No.: 14/750,191

(22) Filed: Jun. 25, 2015

(65) Prior Publication Data

US 2016/0378273 A1 Dec. 29, 2016

(51) Int. Cl.
*G06F 3/0482* (2013.01)

(52) U.S. Cl.
CPC ................... *G06F 3/0482* (2013.01)

(58) Field of Classification Search
CPC .................................................. G06F 3/0482
See application file for complete search history.

(56) References Cited

U.S. PATENT DOCUMENTS

| | | | | |
|---|---|---|---|---|
| 5,559,945 A | * | 9/1996 | Beaudet ................ | G06F 3/0482 715/841 |
| 5,579,119 A | * | 11/1996 | Mimura ............. | G11B 5/00813 360/25 |
| 5,664,133 A | * | 9/1997 | Malamud ............. | G06F 3/0482 345/902 |
| 5,731,801 A | | 3/1998 | Fukuzaki | |
| 5,805,167 A | * | 9/1998 | van Cruyningen ... | G06F 3/0482 715/808 |
| 5,828,376 A | * | 10/1998 | Solimene ............. | G06F 3/0481 715/821 |
| 6,323,884 B1 | * | 11/2001 | Bird ..................... | G06F 3/04812 715/810 |
| 7,168,050 B1 | * | 1/2007 | Kwon, II ............. | G06F 3/0482 348/E17.006 |
| 7,418,670 B2 | * | 8/2008 | Goldsmith ........... | G06F 3/0482 715/810 |
| 7,543,245 B2 | * | 6/2009 | Irimajiri ............... | G06F 3/0482 715/765 |
| 7,546,550 B1 | * | 6/2009 | Buck ..................... | G06F 3/0482 715/808 |
| 8,316,320 B2 | * | 11/2012 | Relyea ................. | G06F 3/0483 715/817 |
| 9,032,328 B1 | * | 5/2015 | Kilat ...................... | G06F 8/315 715/744 |

(Continued)

*Primary Examiner* — Amy M Levy
(74) *Attorney, Agent, or Firm* — Burr Forman McNair

(57) ABSTRACT

A method for a multi-step selection interface is provided including receiving a multistep selection indication, causing, using a processing circuitry, a first selection menu extending in a first direction to be rendered on a display, receiving a first selection indication based on the first selection menu, in response to receiving the first selection indication; causing a second selection menu to be rendered on the display, extending in the first direction in substantially the same position of the display as the first selection menu, and causing a rendering of at least a portion of the first menu to be displaced in a direction substantially perpendicular to the first direction.

12 Claims, 14 Drawing Sheets

(56) References Cited

U.S. PATENT DOCUMENTS

| | | | | |
|---|---|---|---|---|
| 9,830,046 B2* | 11/2017 | Woycik | | G06F 3/0482 |
| 2002/0122072 A1* | 9/2002 | Selker | | G06F 3/0482 |
| | | | | 715/834 |
| 2003/0007010 A1* | 1/2003 | Ullmann | | G06F 3/0482 |
| | | | | 715/810 |
| 2003/0064757 A1* | 4/2003 | Yamadera | | G06F 3/0482 |
| | | | | 455/566 |
| 2004/0165013 A1* | 8/2004 | Nelson | | G06F 3/0482 |
| | | | | 715/858 |
| 2004/0230916 A1* | 11/2004 | Salvatori | | G06F 3/0482 |
| | | | | 715/810 |
| 2005/0054381 A1* | 3/2005 | Lee | | G06F 3/011 |
| | | | | 455/557 |
| 2006/0055789 A1* | 3/2006 | Jin | | G06F 3/0482 |
| | | | | 348/208.12 |
| 2006/0242557 A1* | 10/2006 | Nortis, III | | G06F 3/0482 |
| | | | | 715/234 |
| 2007/0186183 A1* | 8/2007 | Hudson, Jr. | | G06F 3/0482 |
| | | | | 715/810 |
| 2007/0198949 A1* | 8/2007 | Rummel | | G06F 3/0482 |
| | | | | 715/810 |
| 2009/0019394 A1* | 1/2009 | Sekimoto | | H04N 5/44543 |
| | | | | 715/811 |
| 2009/0064057 A1* | 3/2009 | Bull | | G06F 3/048 |
| | | | | 715/864 |
| 2009/0228832 A1* | 9/2009 | Cheng | | G06F 3/0482 |
| | | | | 715/810 |
| 2010/0229125 A1* | 9/2010 | Cha | | G06F 3/017 |
| | | | | 715/828 |
| 2010/0306650 A1* | 12/2010 | Oh | | G06F 3/0482 |
| | | | | 715/702 |
| 2011/0113371 A1* | 5/2011 | Parker | | G06F 1/3215 |
| | | | | 715/810 |
| 2011/0320984 A1* | 12/2011 | Irani | | G06F 3/0482 |
| | | | | 715/841 |
| 2012/0124523 A1* | 5/2012 | Zhang | | G06F 9/4443 |
| | | | | 715/841 |
| 2012/0231853 A1* | 9/2012 | Takahashi | | G06F 3/04883 |
| | | | | 455/566 |
| 2013/0019206 A1* | 1/2013 | Kotler | | G06F 3/04812 |
| | | | | 715/834 |
| 2015/0092067 A1* | 4/2015 | Yu | | H04N 1/00156 |
| | | | | 348/207.1 |
| 2015/0355805 A1* | 12/2015 | Chandler | | G06F 3/0482 |
| | | | | 715/784 |
| 2016/0200195 A1* | 7/2016 | Jun | | B60K 35/00 |
| | | | | 715/765 |
| 2017/0139556 A1* | 5/2017 | Josephson | | G06F 3/0482 |

* cited by examiner

APPARATUS AND METHOD FOR A MULTI-STEP SELECTION INTERFACE

TECHNICAL FIELD

Example embodiments generally relate to selection interfaces and, in particular, relate to a multi-step selection interface.

BACKGROUND

Many pointer-based interfaces allow selection of a particular item from among a large number of options, for example, a digital music player can allow a listener to select a particular song from within a catalog of thousands of songs. In another example, in the context of a military command and control center, an operator interface may allow selection of a particular asset (for tasking) from a large pool of available assets.

Forcing the user to perform the selection directly can be tedious and time consuming when a large number of choices is available. Consequently, many such interfaces ease the selection by providing a multi-step process. For example, a digital music player may allow a listener to designate a song by traversing a selection hierarchy (e.g. Artist:Album:Song). An operator interface in the command and control center may allow successive application of (not necessarily hierarchical) filters (e.g. NorthAmerica:Aircraft:Stealth) to narrow the range of available choices prior to final designation of an asset. At each step in the multi-step selection process, the interface requires the user to choose from among a manageable number of choices.

Completion of such a multi-step selection process with a pointer-based interface may remain difficult in unsteady or high stress environments. For example, a listener may struggle to select a song on a touch screen interface while walking or jogging, and the command and control center operator may struggle to accurately move a mouse or trackball in a crisis situation.

BRIEF SUMMARY OF SOME EXAMPLES

Accordingly, some example embodiments may enable a multi-step selection interface as described below. In one example embodiment, an apparatus is provided including processing circuitry configured to for a multi-step selection interface. The processing circuitry may be configured to cause performance of operations including receiving a multistep selection indication, causing a first selection menu extending in a first direction on a display to be rendered, receiving a first selection indication based on the first selection menu. In response to receiving the first selection indication the processing circuitry may be configured for causing a second selection menu to be rendered on the display, extending in the first direction in substantially the same position of the display as the first selection menu and causing a rendering of at least a portion of the first menu to be displaced in a direction substantially perpendicular to the first direction.

In another example embodiment, a method for a multi-step selection interface is provided including receiving a multistep selection indication, causing, using a processing circuitry, a first selection menu extending in a first direction to be rendered on a display, receiving a first selection indication based on the first selection menu. In response to receiving the first selection indication, the method also includes causing a second selection menu to be rendered on the display, extending in the first direction in substantially the same position of the display as the first selection menu and causing a rendering of at least a portion of the first menu to be displaced in a direction substantially perpendicular to the first direction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4A:
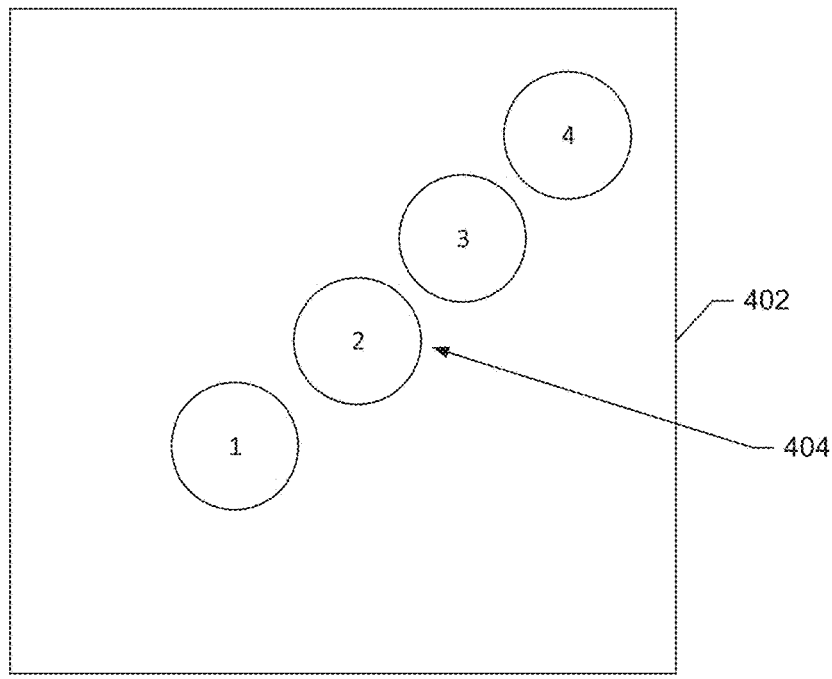
Figure 4B:
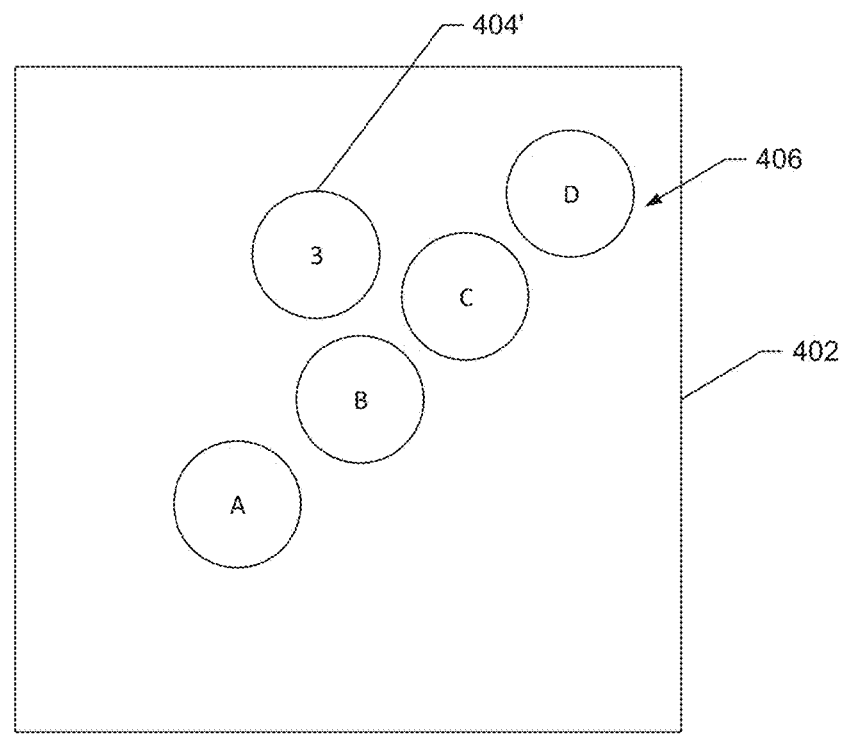
Figure 5A:
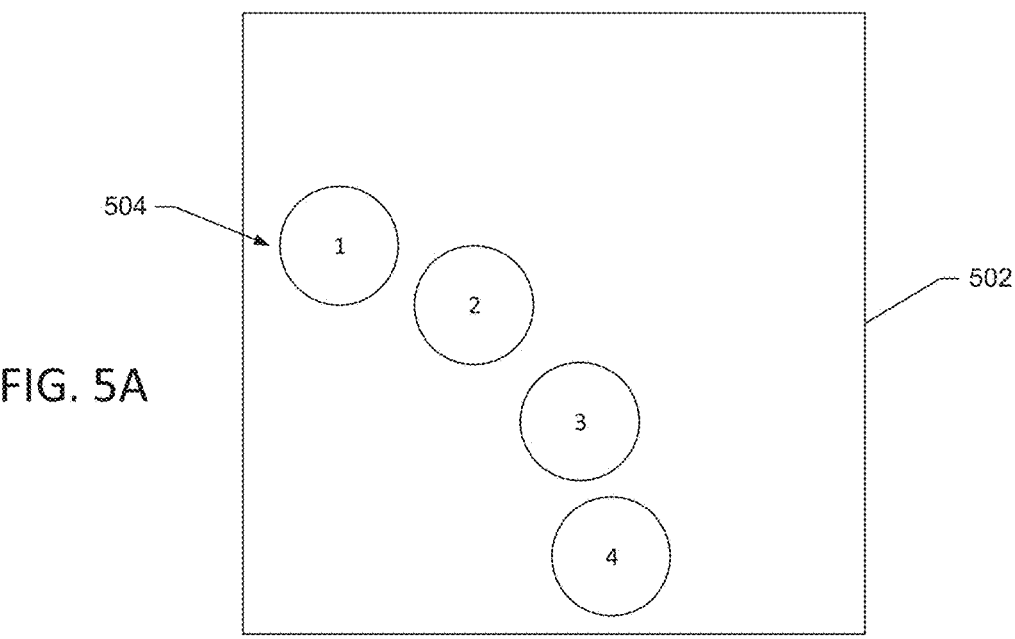
Figure 5B:
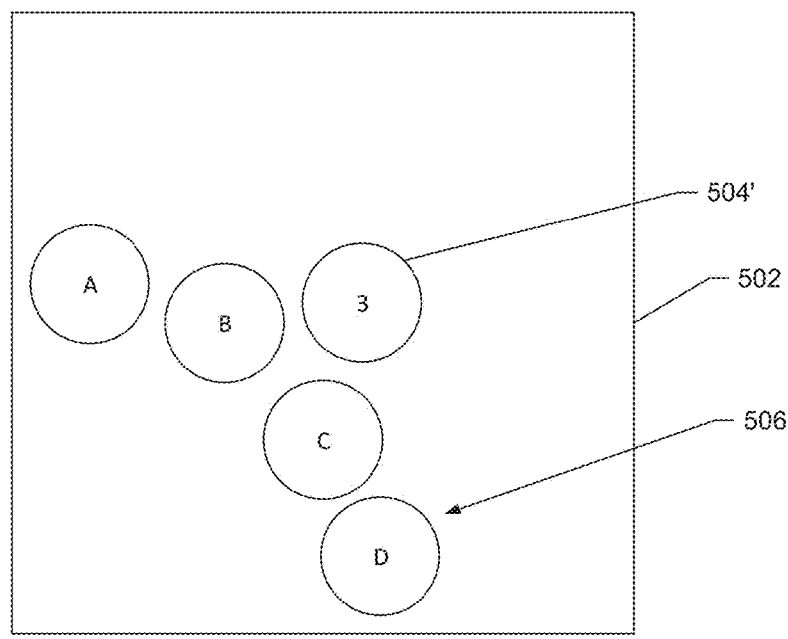
Figure 6A:
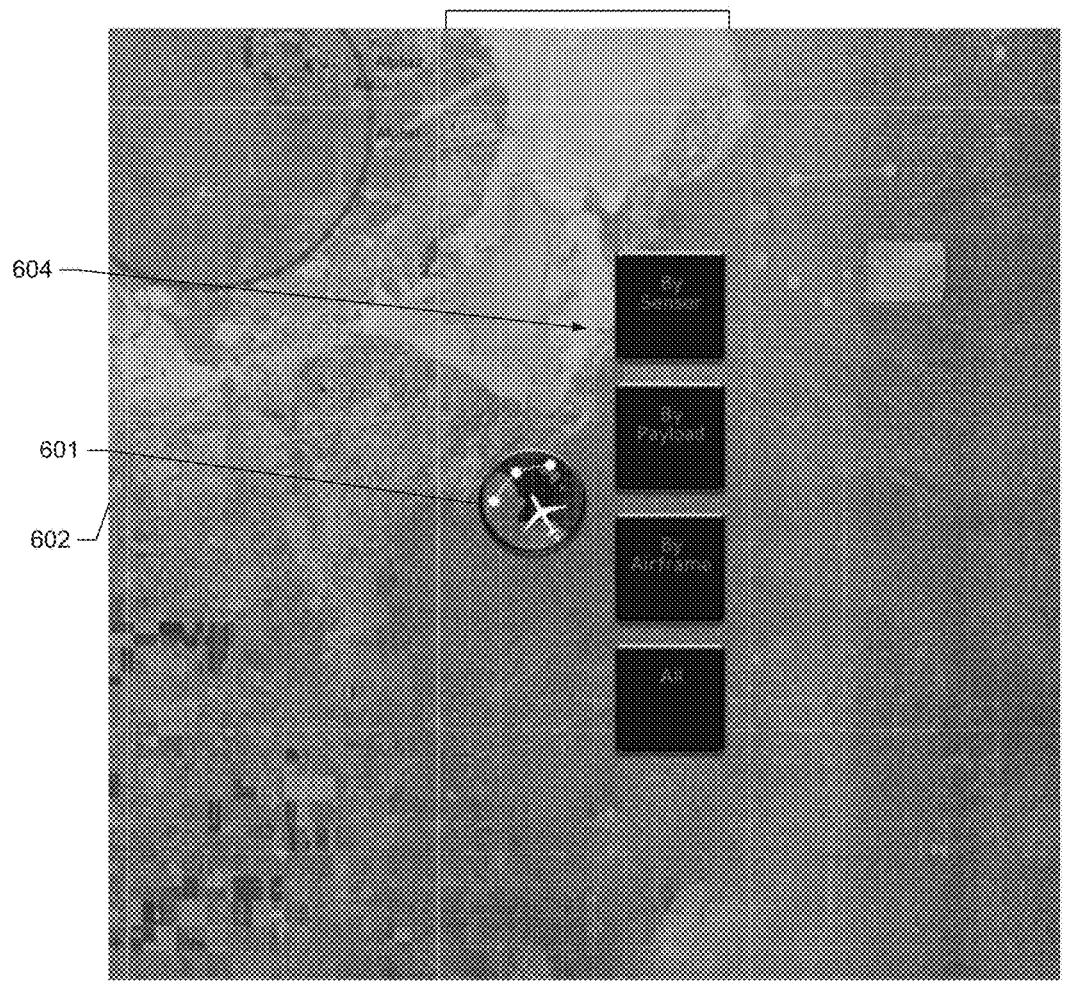
Figure 6B:
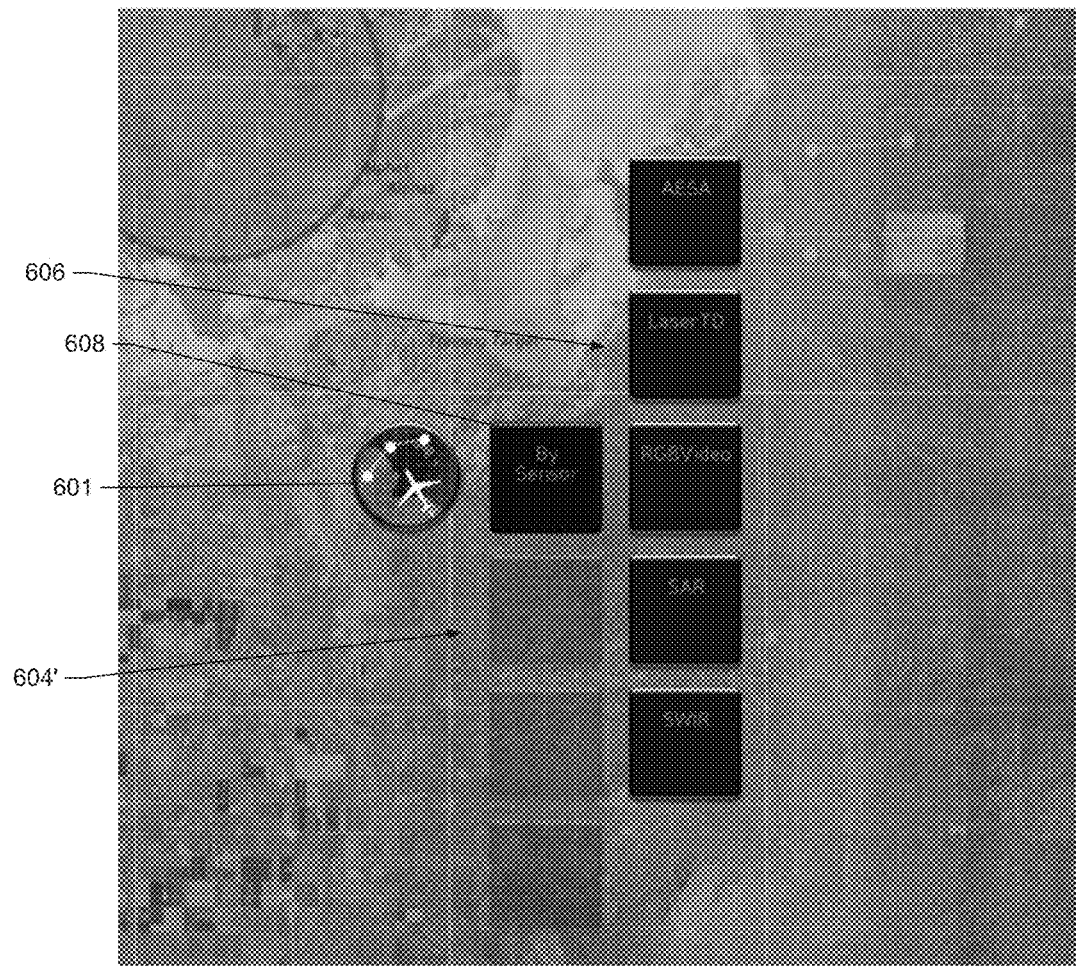
Figure 6C:
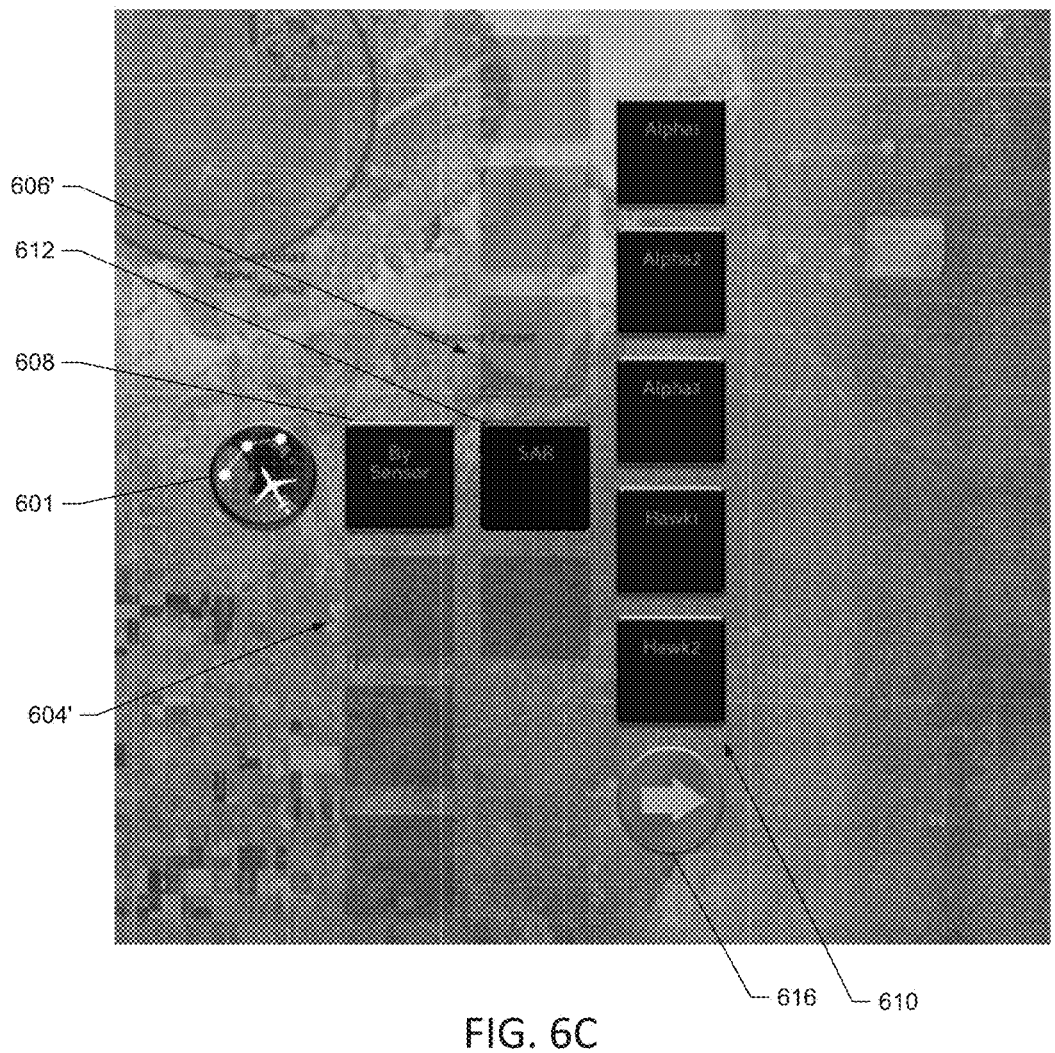
Figure 6D:
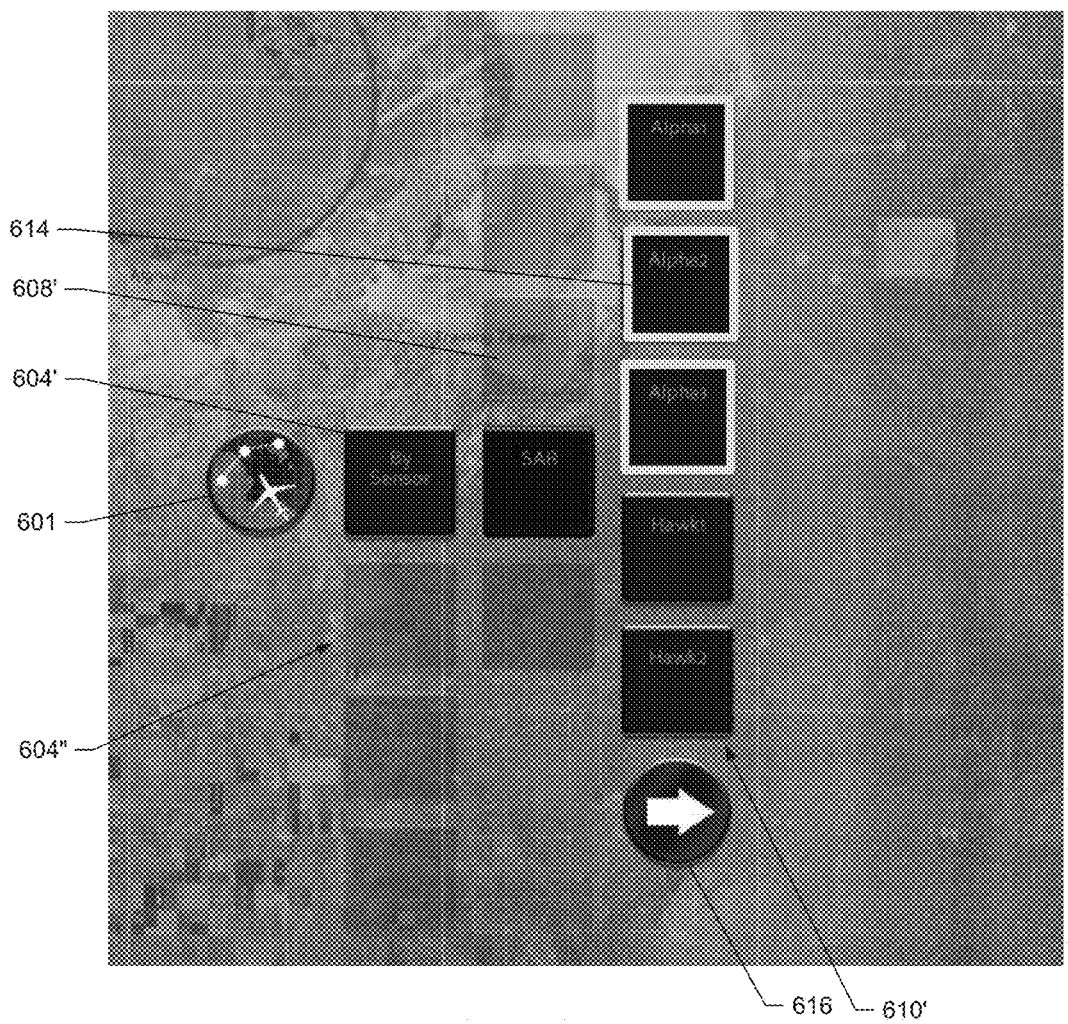
Figure 7:
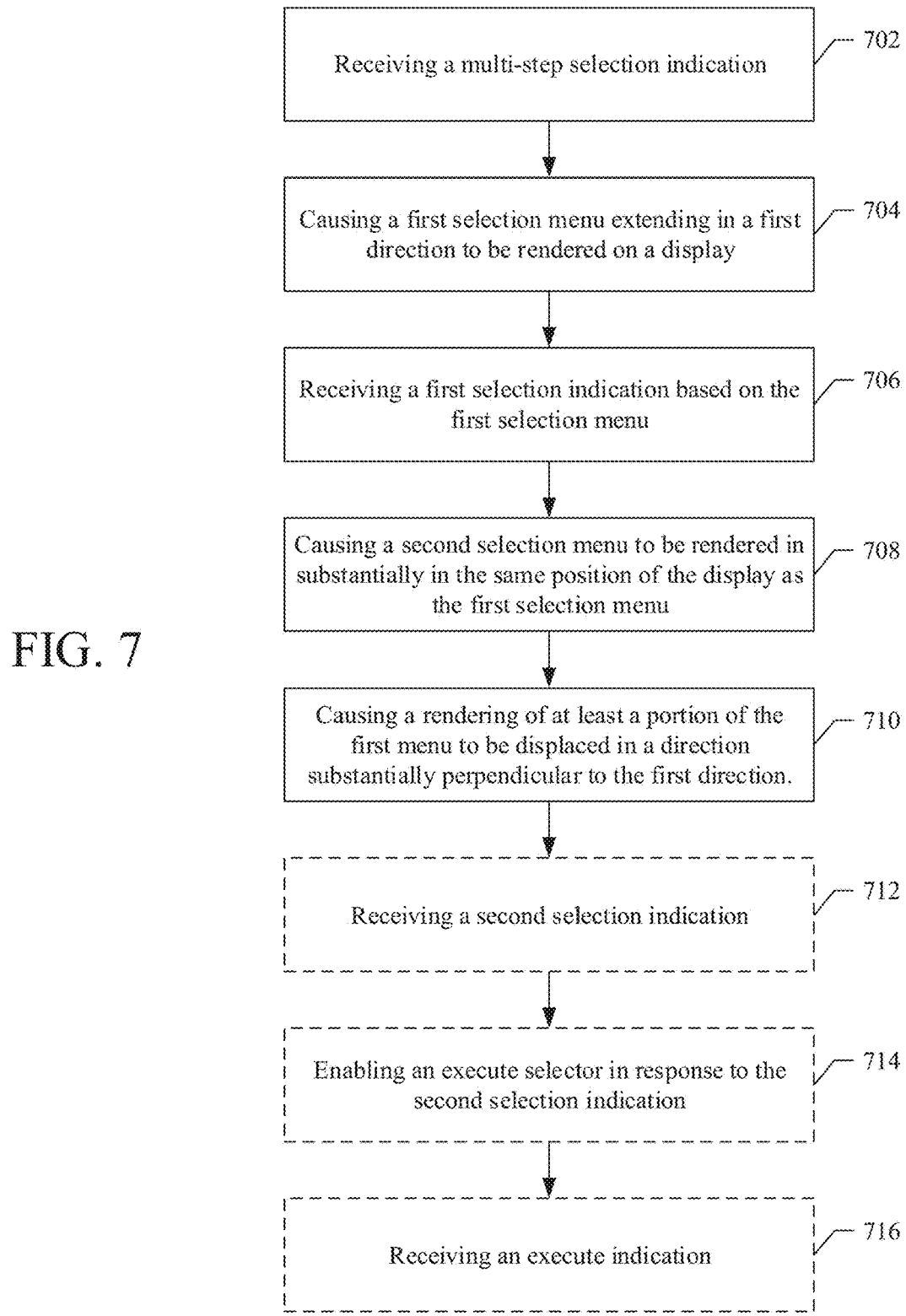

FIGS. 4A-B illustrate an example embodiment of multi-step selection interface configuration in accordance with some example embodiments;

FIGS. 5A-B illustrate an example multi-step selection interface configuration in accordance with an example embodiment;

FIGS. 6A-6D illustrate a multi-step selection interface for a command control application in accordance with an example embodiment; and FIG. 7 illustrates a method of rendering a multi-step selection interface in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

In some examples, the present invention may provide an apparatus and method which allows a user to navigate a multi-step selection interface with a minimum amount of wasted pointer movement (e.g. finger, mouse, for trackball movement). Since users may make mistakes and wish to alter a selection in progress, the multi-step selection interface may allow for convenient revision of choices made in earlier steps of the multi-step process.

In some instances users may routinely make selections with a high degree of similarity (e.g. common choices for early steps in the multi-step process); accordingly the interface may allow for convenient recall and application of common prior selections. Similarly, some selection options may have a higher probability of selection than others. In such as instance, the multi-step selection interface may base the rendering of menus based on the selection probability to minimize pointer movement.

A pointer based multi-step selection interface may allow the user to make a selection from a large number of options in an efficient multi-step process. At each step of the multi-step selection process, a set of selection items, e.g. GUI (graphical user interface) buttons, may be provided. The selection item GUI buttons may be provided in a convenient location, such as the center of the display for ease of viewing, a right or left bottom of the display for thumb selection on a mobile device screen, or the like. The set of GUI buttons may extend in a single direction, such as vertical, horizontal, diagonal, arc, or the like. In an instance in which the user selects one of the GUI buttons, a second selection menu may be provided in substantially the same position of the GUI that the first selection menu was rendered. The first selection menu, or portion of the selection menu, such as the selected GUI button may be displaced perpendicularly to the direction of the second selection menu, e.g. if the second selection menu is rendered vertically, the first selection menu will be displaced horizontally, such as to the left or right.

The selection process may continue to through the various selection menus and provide an execute indication. In some embodiments, selection of the final selection menu item enables the execute selector preventing inadvertent selections.

Example System

Figure 1:
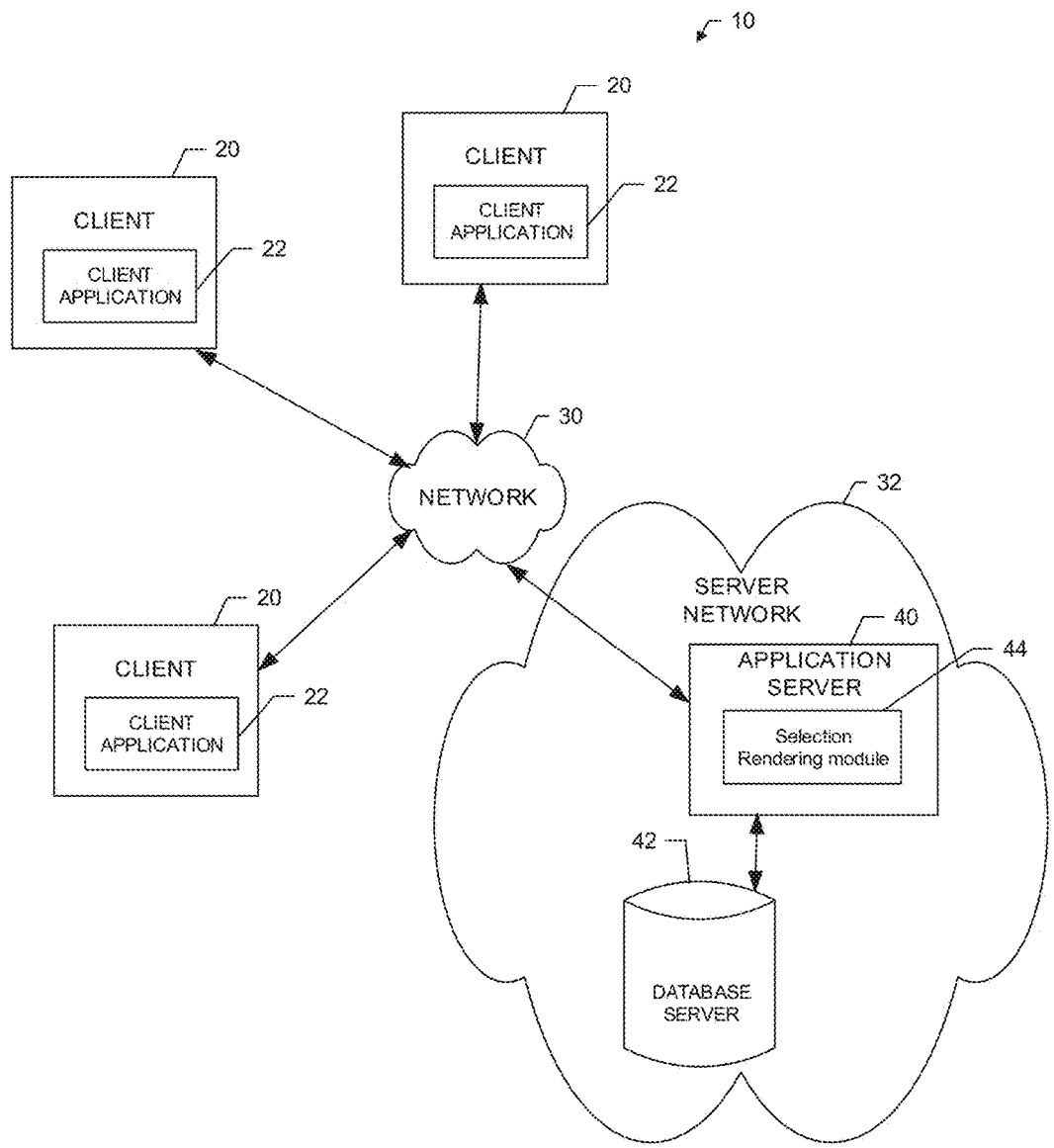
FIG. 1 illustrates a functional block diagram of a system that may be useful in connection with a multi-step selection interface according to an example embodiment.

An example embodiment of the invention will now be described in reference to FIG. 1, which illustrates an example system in which an embodiment of the present invention may be employed. As shown in FIG. 1, a system 10 according to an example embodiment may include one or more client devices (e.g. clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing files as described herein.

The clients 20 may, in some cases, each be associated with a single organization, department within an organization, or location (i.e. with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g. a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g. downloadable software to configure the clients 20, or information for consumption/processing at the clients 20). As such, for example, the client application 22 may include corresponding executable instructions for configuring the client 20 to provide corresponding functionalities for multi-step selection interface, as described in greater detail below.

The network 30 may be a data network, such as a local area network (LAN), a metropolitan area network (MAN), a wide area network (WAN) (e.g. the Internet), and/or the like, which may couple the clients 20 to devices such as processing elements (e.g. personal computers, server computers or the like) and/or databases. Communication between the network 30, the clients 20 and the devices or databases (e.g. servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g. application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information descriptive of selection options (e.g. selection trees, GUI button sets, or the like). In some cases, these contents may be stored in the database server 42. Alternatively or additionally, the application server 40 may be configured to provide analytical tools for use by the clients 20 in accordance with example embodiments.

In some embodiments, for example, the application server 40 may therefore include an instance of a selection rendering module 44 comprising stored instructions for handling activities associated with practicing example embodiments as described herein. As such, in some embodiments, the clients 20 may access the selection rendering module 44 online and utilize the services provided thereby. However, it should be appreciated that in other embodiments, the selection rendering module 44 may be provided from the application server 40 (e.g. via download over the network 30) to one or more of the clients 20 to enable recipient clients to instantiate an instance of the selection rendering module 44 for local operation. As yet another example, the selection rendering module 44 may be instantiated at one or more of the clients 20 responsive to downloading instructions from a removable or transferable memory device carrying instructions for instantiating the selection rendering module 44 at the corresponding one or more of the clients 20. In such an example, the network 30 may, for example, be a peer-to-peer (P2P) network where one of the clients 20 includes an instance of the selection rendering module 44 to enable the corresponding one of the clients 20 to act as a server to other clients 20. In a further example embodiment, the selection rendering module 44 may be distributed amongst one or more clients 20 and/or the application server 40.

In an example embodiment, the application server 40 may include or have access to memory (e.g. internal memory or the database server 42) for storing instructions or applications for the performance of various functions and a corresponding processor for executing stored instructions or applications. For example, the memory may store an instance of the selection rendering module 44 configured to operate in accordance with an example embodiment of the present invention. In this regard, for example, the selection rendering module 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g. a computer including a user interface) via which analysts may interact with, configure or otherwise maintain the system 10.

As such, the environment of FIG. 1 illustrates an example in which provision of content and information associated with the rendering such as, for example, security or intelligence operations may be accomplished by a particular entity (namely the selection rendering module 44 residing at the application server 40). However, it should be noted again that the selection rendering module 44 could alternatively handle provision of content and information within a single organization. Thus, in some embodiments, the selection rendering module 44 may be embodied at one or more of the clients 20 and, in such an example, the selection rendering module 44 may be configured to handle provision of content and information associated with analytical tasks that are associated only with the corresponding single organization. Access to the selection rendering module 44 may therefore be secured as appropriate for the organization involved and credentials of individuals or analysts attempting to utilize the tools provided herein.

Example Apparatus

Figure 2:
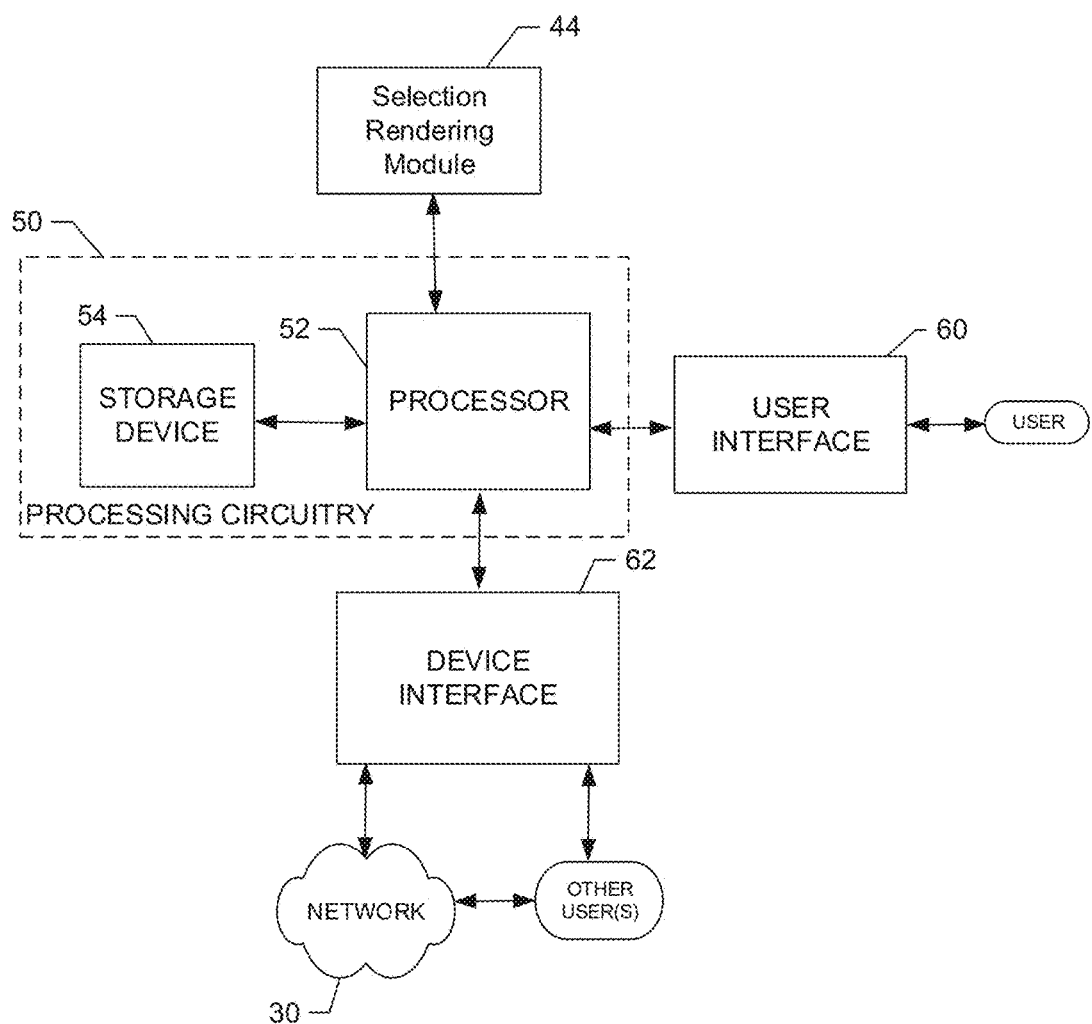
FIG. 2 illustrates a functional block diagram of an apparatus that may be useful in connection with multi-step selection interface according to an example embodiment.

An example embodiment of the invention will now be described with reference to FIG. 2. FIG. 2 shows certain elements of an apparatus for a multi-step selection interface according to an example embodiment. The apparatus of FIG. 2 may be employed, for example, on a client (e.g. any of the clients 20 of FIG. 1) or a variety of other devices (such as, for example, a network device, server, proxy, or the like (e.g. the application server 40 of FIG. 1)). Alternatively, embodiments may be employed on a combination of devices. Accordingly, some embodiments of the present invention may be embodied wholly at a single device (e.g. the application server 40 or one or more clients 20) or by devices in a client/server relationship (e.g. the application server 40 and one or more clients 20). Furthermore, it should be noted that the devices or elements described below may not be mandatory and thus some may be omitted in certain embodiments.

Referring now to FIG. 2, an apparatus configured for a multi-step selection interface is provided. The apparatus may be an embodiment of the selection rendering module 44 or a device hosting the selection rendering module 44. As such, configuration of the apparatus as described herein may transform the apparatus into the selection rendering module 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g. an integrated circuit chip) configured (e.g. with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g. at a computer terminal or client device such as one of the clients 20) that may be in communication with the processing circuitry 50 via the device interface 62 and/or a network (e.g. network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g. database server 42) that may store a variety of files, contents or data sets. Among the contents of the storage device 54, applications (e.g. client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g. physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the selection rendering module 44, which may be any means, such as, a device or circuitry operating in accordance with software or otherwise embodied in hardware or a combination of hardware and software (e.g. processor 52 operating under software control, the processor 52 embodied as an ASIC or FPGA specifically configured to perform the operations described herein, or a combination thereof) thereby configuring the device or circuitry to perform the corresponding functions of the selection rendering module 44 as described below.

The selection rendering module 44 manager may include tools to facilitate a multi-step selection interface via the network 30. In an example embodiment the selection rendering module 44 may be configured for receiving a multi-step selection indication, causing a first selection menu extending in a first direction on a display to be rendered, receiving a first selection indication based on the first selection menu, in response to receiving the first selection indication; causing a second selection menu to be rendered on the display, extending in the first direction in substantially the same position of the display as the first selection menu, and causing a rendering of at least a portion of the first menu to be displaced in a direction substantially perpendicular to the first direction. In some example embodiments the selection rendering module 44 may be further configured for receiving a second selection indication based on the second selection menu and receiving an execute indication. In an example embodiment, the selection rendering module 44 may be further configured for enabling an execute selector in response to the receiving the second selection indication.

In some embodiments, the selection rendering module 44 may further include one or more components or modules that may be individually configured to perform one or more of the individual tasks or functions generally attributable to the selection rendering module 44. However, the selection rendering module 44 need not necessarily be modular. In cases where the selection rendering module 44 employs modules, the modules may, for example, be configured for a multi-step selection interface, as described herein, compare sequences and/or the like. In some embodiments, the selection rendering module 44 and/or any modules comprising the selection rendering module 44 may be any means such as a device or circuitry operating in accordance with software or otherwise embodied in hardware or a combination of hardware and software (e.g. processor 52 operating under software control, the processor 52 embodied as an ASIC or FPGA specifically configured to perform the operations described herein, or a combination thereof) thereby configuring the device or circuitry to perform the corresponding functions of the selection rendering module 44 and/or any modules thereof, as described herein.

Example Multi-Step Selection Interface

Figure 3A:
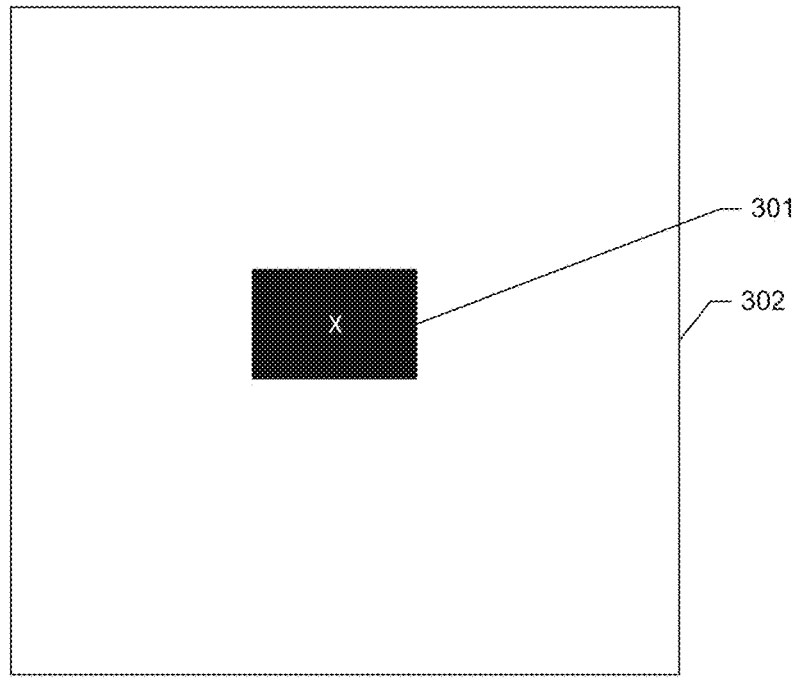
FIG. 3A-3H illustrates a multi-step selection interface flow in accordance with an example embodiment.

An example embodiment will now be described in general terms in relation to a multi-step selection interface. FIG. 3A illustrates a GUI display area 302 and a multi-step selection initiator 301. The multi-step selection initiator 301 may be an icon, a hyperlink, an embedded object, a menu option, or the like. Interaction with the multi-step selection initiator 301, such as clicking, touching, or otherwise selecting, may cause a multi-step selection indication to be received, causing a first selection menu 304 to be rendered.

Figure 3B:
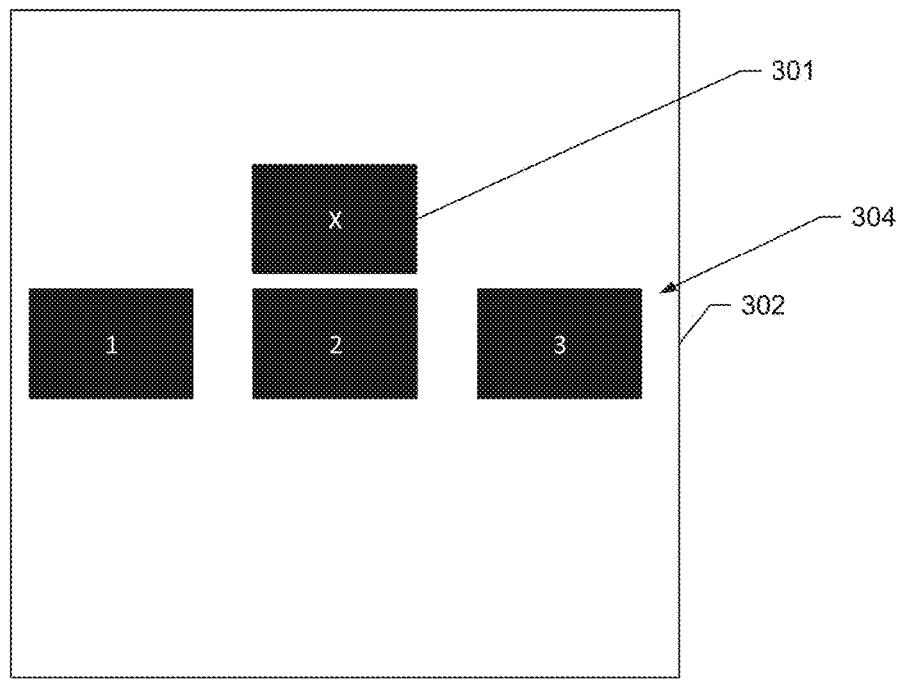

FIG. 3B illustrates the first selection menu 304 of a multi-step selection interface. The first selection menu 304 may extend in a first direction such as, vertical, horizontal, diagonal, arc, or the like. In the example provided in FIG. 3B, the first selection menu 304 extends horizontally. The first selection menu 304 may be rendered in a predetermined position, such as the center of the display area 302, or a left right, top, bottom, or corner section of the GUI display area 302, for thumb selection on mobile devices. The first selection menu 304 may begin, end, or be centered on the predetermined location. In another example embodiment, the first selection menu 304 may be rendered in substantially the same position of the GUI display area 302 at which the multi-step selection initiator 301 was previously rendered.

Figure 3C:
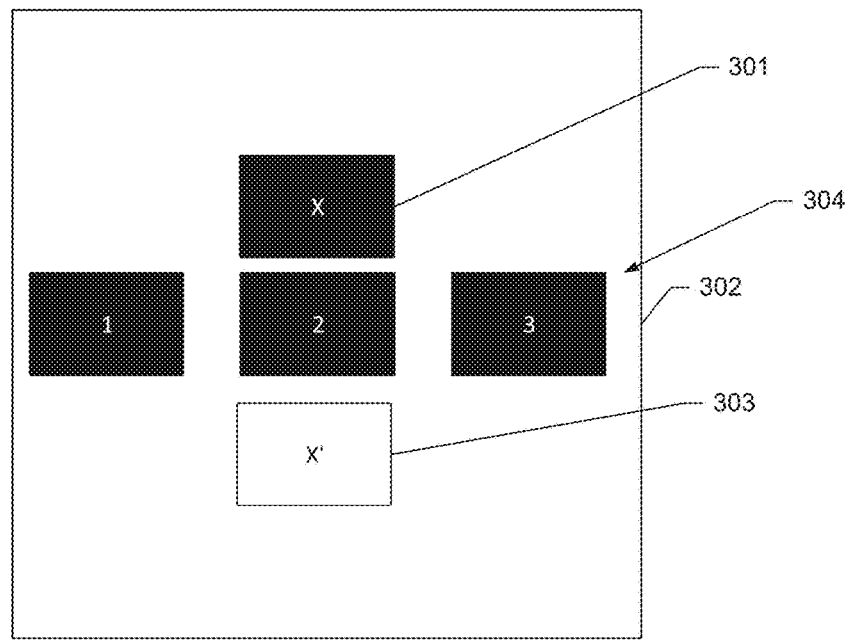

FIG. 3C illustrates a multi-step selection interface substantially similar to FIG. 3B, in which a subsequent menu is indicated, the subsequent menu indication 303, may be an indication of a following selection, or provide some information regarding the type of selection. In an example embodiment in which the multi-step selection interface is for music, the first selection menu 304 may be "Artist", each of the selection item GUI buttons for the first selection menu may be a particular artist and the subsequent selection indicator may indicate, e.g. by text, icon, or the like, "Albums."

In an example embodiment in which the multi-step selection interface is configured for selection of a person, the first selection menu 304 may be top-level classification, such as "short" "medium" and "tall." Each of the selection item GUI buttons of the first selection menu may be associated with a classification. In another example embodiment, the first selection menu 304 may be associated with classes of classes, such as "by height," by age," "by weight," or the like.

In some example embodiments the first and/or subsequent selection menus may be rendered based on probability of selection. For example, high probability selection items may be rendered at or near the center of the current selection menu to minimize movement of the pointer. The probability of selection may be based on historical selections, by the user or group of users, or predetermined by statistical analysis or programmer determination.

The user may interact with one or more selection items, such as by touching, clicking, or otherwise selecting a GUI button. In an example embodiment, only one selection item may be selected in each selection menu. In an alternative embodiment, multiple selection items may be selected in one or more selection menus. In an example embodiment in which only one item may be selected in a selection menu, the multi-step selection interface may automatically advance to the next selection menu when a selection is made. In an example embodiment in which one or more selection items may be selected in a selection menu, the multi-step selection interface may have an advance button to indicate the next selection menu may be rendered. In some example embodiments, the advance button may be disabled, such as grayed out or inactive, until at least one or a predetermined number of selections has been made.

Figure 3D:
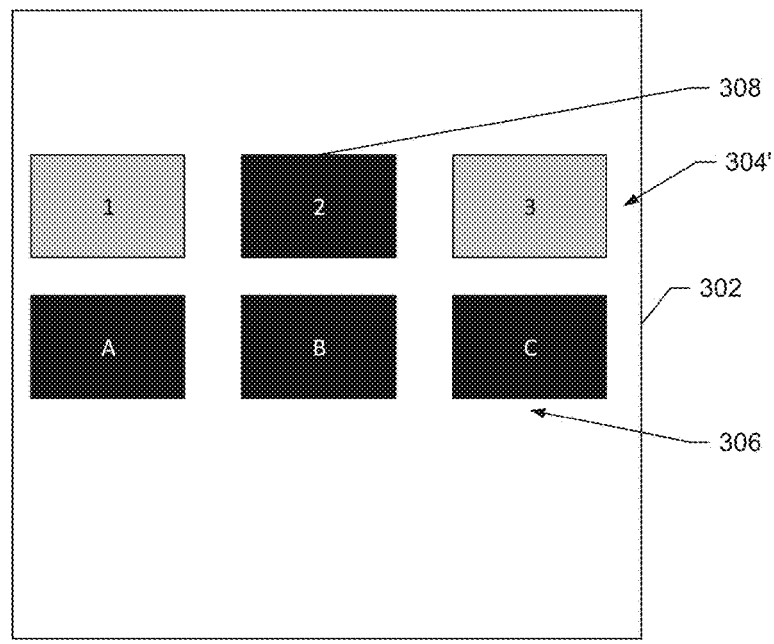

A selection indication may be received based on the first selection menu 304' as shown in FIG. 3D. A second selection menu 306 may be rendered in substantially the same position of the GUI display area 302, as the first selection menu 304, of FIG. 3B. The first selection menu 304', or portion of the first selection menu, such as the selected item or items 308, may be displaced in a direction substantially perpendicular to the extension of the second selection menu 306, in this example the displacement is vertical and the second selection menu extension is horizontal. Iteration of this process, through successive sets of selection menus may allow rapid navigation through a very large number of available options.

In an example embodiment, the successive selection menus may be influenced by the prior selections to narrow the selection classifications, for example, by height=tall: gender=male. Such context sensitive generation of selection menus may further streamline the selection process, reducing the cognitive load placed on the user.

By positioning successive sets of selection menu selection items, e.g. GUI buttons, in substantially the same position as the previous selection menu GUI buttons and in the same direction of extension, the multi-step selection interface may limit pointer movement to a single dimension e.g. direction, such as horizontal in the present example. The movement of the pointer may be further reduced by utilizing the probability of selection to increase the likelihood that the selections rendered at the position of the pointer will be selected. In an example embodiment, a user may select a first item for the first menu, and several subsequent items from various subsequent selection menus without moving the pointer.

After a selection indication is received for the first selection menu, the first selection menu 304' may be rendered as a whole or as a portion of the selection menu. In an instance in which the first selection menu 304' is rendered as a whole, the selection menu may be rendered in a manner indicating that the selection is complete, such as partially or wholly grayed out. In some embodiments, the selected item 308 of the first selection menu 304' may be rendered differently than other items in the first selection menu to differentiate the selected item, for example the selected item may be fully rendered and the non-selected items may be grayed out.

Figure 3E:
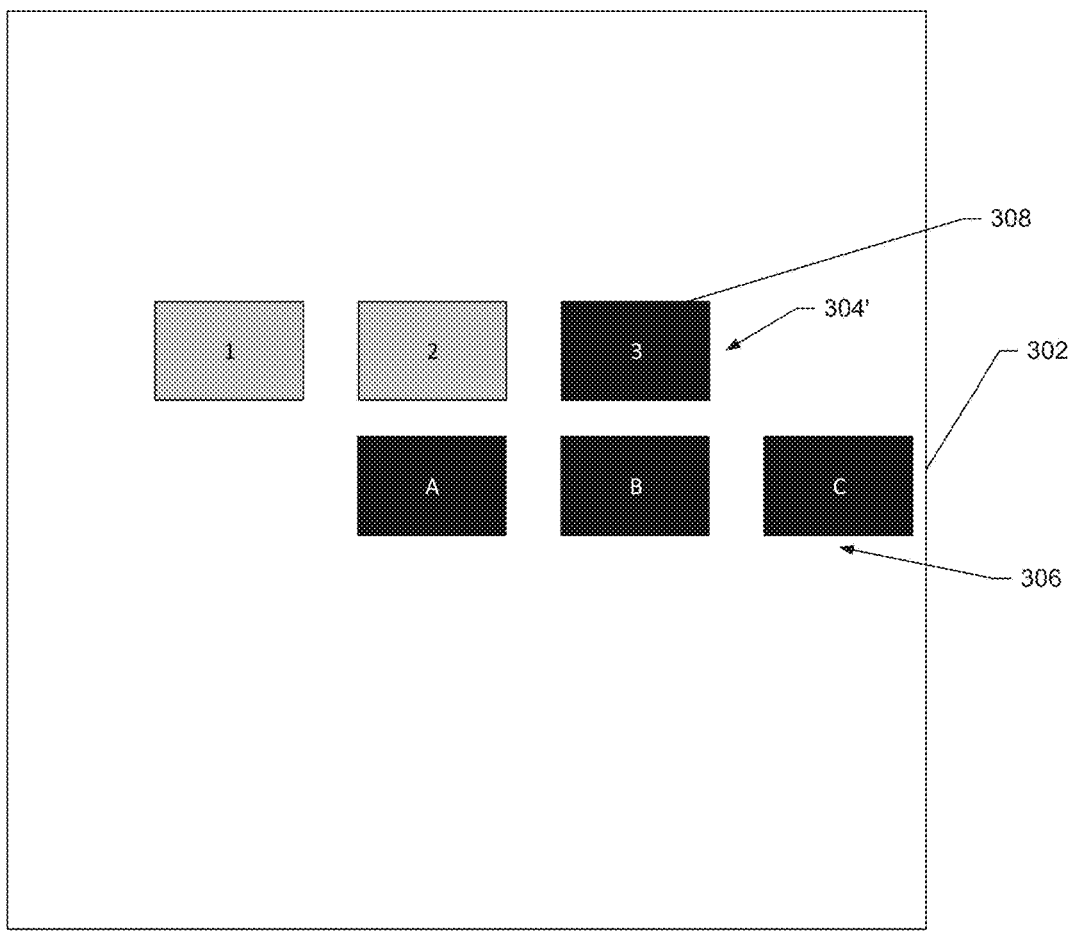

In an example embodiment, subsequent selection menus may be rendered with a center at or near the location of the selected item of the previous selection menu. In an instance in which the selected item is not the at the center of the menu as depicted in FIG. 3E, the subsequent menu 306 may be rendered with a center position in substantially the same position as the selected item 308 of the previous selection menu 304'. Alternatively, a menu may be shifted after selection, such that the selected item 308 is in a center position, and the subsequent menu is rendered in substantially the same position of the previous menu. In some examples of this embodiment, the highest probability of selections items are centered in the selection menu.

In an embodiment in which the first selection menu 304' is partially rendered, the first selection menu may display only the selected item 308. In some example embodiments, the first selection menu 304' may include the selected item 308 and/or one or more non-selected items on either side of the selected item.

In an instance in which a user interacts, e.g. touches, clicks, or otherwise selects the first selection menu 304' or portion thereof, the multi-step selection menu may return to the first selection menu 304, as depicted in FIG. 3C. The second selection menu 306 may be removed from the GUI display area 302 and the first selection menu 304 may be rendered in the substantially the same position that the second selection menu 306 had previously been rendered. In some example embodiments, the previously selected items may be indicated, such as highlighting or outlining. A user may select any item from the first selection menu 304 to again advance to the second selection menu 306, as discussed above.

In an instance in which the user selects an item from the first selection menu 304 which is different from the previous selection in the first selection menu, the multi-step selection interface may cancel, delete, or otherwise clear the subsequent selections. The subsequent selections may be canceled due to dependency on previous selections. The subsequent selection menus may render new or different items depending on the items selected in preceding selection menus. In an instance in which one or more subsequent selections are not dependent on a changed selection, the multi-step selection interface may maintain the selection for the unaffected menu or indicate the previous selection in an instance in which the unaffected selection menu is revisited.

Figure 3F:
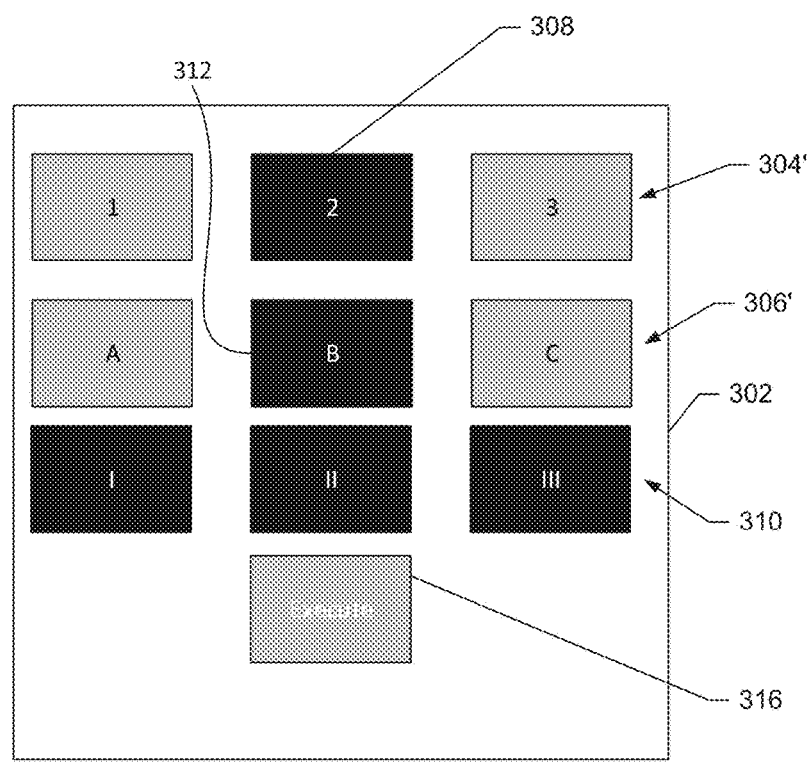

FIG. 3F illustrates a multi-step selection interface in which a first selected item 308 has been selected in the first selection menu 304' and a second selected item 312 has been selected in the second selection menu 306'. A third selection menu 310 has been rendered in substantially the same position of the GUI display area 302 as the second selection menu 306 was rendered in FIG. 3D, in response to a second selection indication based on the second selection menu. The first selection menu 304' and second selection menu 306' have been displaced vertically, perpendicular to the horizontal extension of the thirds selection menu 310. In an example embodiment, one or more previous selection menus may be rendered, for example the last selection menu, last three selection menus, all previous selection menus or the like.

An execute selector 316 button or icon may be rendered in the GUI display area 302. The execute selector may be rendered but inactive, e.g. grayed out or disabled, until a selection is made in the final selection menu, e.g. the third selection menu 310. In an example embodiment, a multi-step selection interface may have n selection menus and the execute selector 316 may be enable by selection of one or more selection items in an $n^{th}$ selection menu.

Figure 3G:
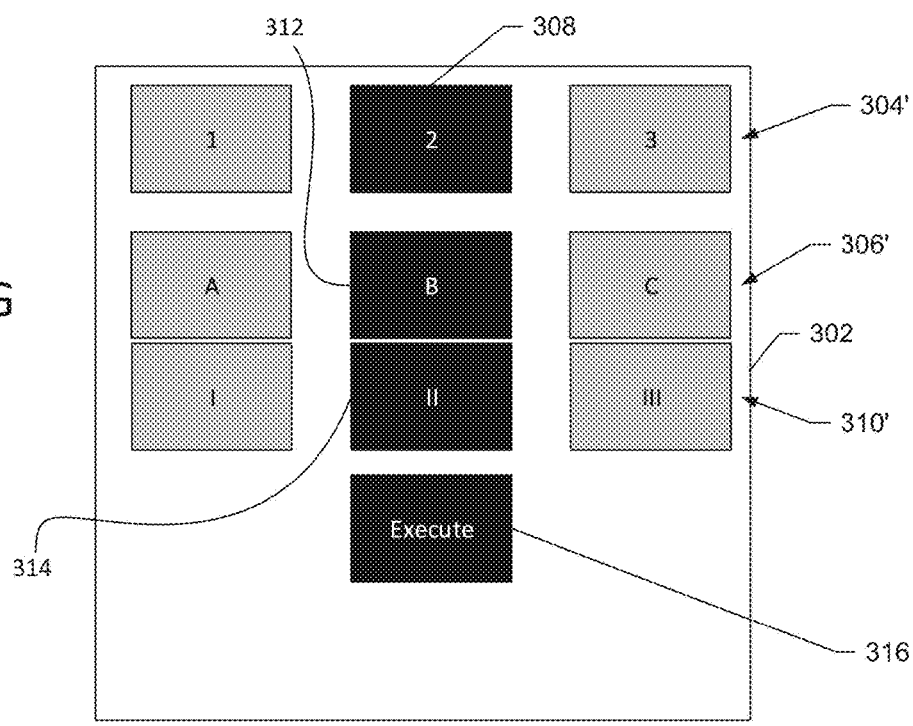

FIG. 3G illustrates a multi-step selection interface in which the final selection has been completed, e.g. selection item 314 of the third selection menu 310' has been selected. Selection of one or more items in the third selection menu 310' may cause the execute selector to be enabled. The user may interact with the execute selector, e.g. touch, click or other wise select the execute selector, causing the multi-step selection interface to receive an execute indication, indicating that the selections made in the multi-step selection interface should be executed, as indicated by the various selection items selected in each of the selection menus.

Figure 3H:
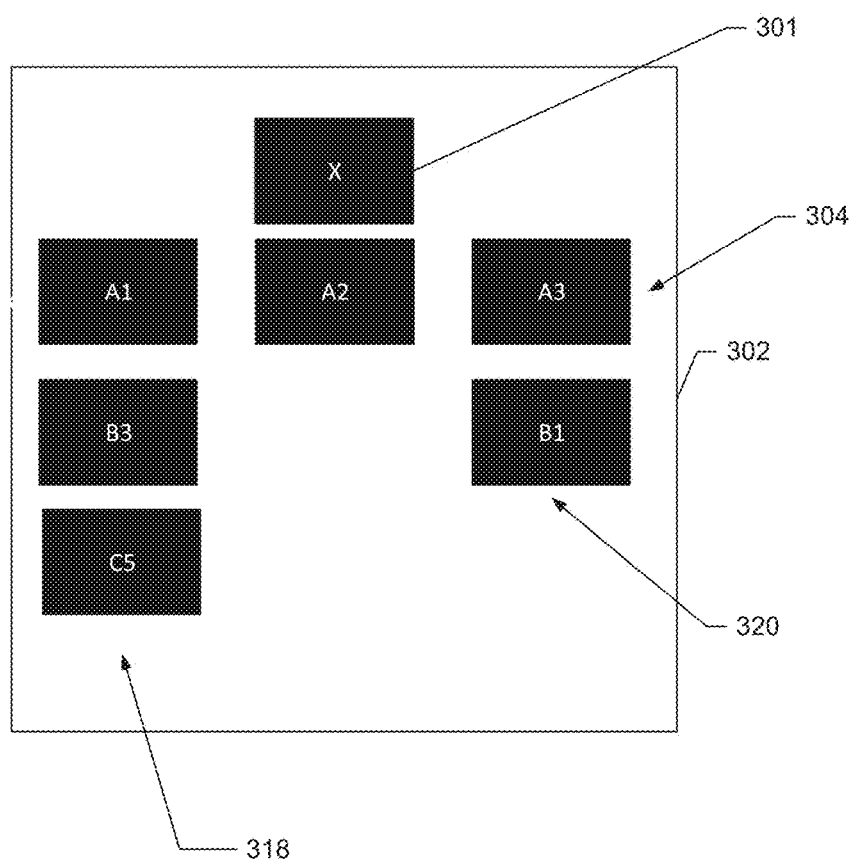

FIG. 3H illustrates an example embodiment in which historical, or high probability of selection, selection chains 318, 320 may be rendered for selection. In an example embodiment, previously selected, or high probability of selection, selection chains may be rendered with the current selection menu 304. A multi-step selection initiator 301 may be selected, causing the rendering of a first selection menu 304. In addition to the first selection menu 304, one or more selection chains 318, 320 may be rendered substantially perpendicular to the first selection menu. The user may select an item from the first selection menu 304, or from one of the selection chains. Selection of an item in a selection chain 318, 320 may also select each of the intervening selections. The selection chain extending from the first selection menu 304 item "A1" includes "B3" of the second selection menu and "C5" of the third selection menu. Selection of C5 may also cause selection of B3 and A1. Alternatively, selection of B3 may cause selection of B3 and A1 and may cause the third selection menu to be rendered for item selection. The selection chain selection may allow for rapid selection of interviewing selections with high probability of selection.

The multi-step selection interface may be advantageous for selections in which the choices available in each successive step are at least partially dependent on one or more previous selections. Some example applications may include hierarchical classifications or successive applications of filters. The successive selections may be adaptive, presenting a user with the relevant in-context choices in each selection menu guiding the user through an efficient progression which rapidly converges on the desired option or options.

FIGS. 4A and 4B illustrate an example multi-step selection interface configuration. The first selection menu 404 may extend diagonally across the GUI display area 402. In an instance in which a selection is made in the first selection menu 404, a second selection menu 406 may be rendered extending diagonally across the display area GUI 402 in substantially the same position which the first selection menu was previously rendered. The rendering of first selection menu 504' or portion thereof may be displaced in a direction substantially perpendicular to the direction of extension of the second selection menu 506, e.g. the first selection menu may be displaced in the opposite diagonal direction relative to the second selection menu.

FIGS. 5A and 5B illustrate an example multi-step selection interface configuration. The first selection menu 504 may extend in an arc across the GUI display area 502, such as from a first display edge to a second display edge. In an instance in which a selection is made in the first selection menu 504, a second selection menu 506 may be rendered extending in an arc across the GUI display area 502 in substantially the same position which the first selection menu was previously rendered. The rendering of the first selection menu 504' or portion thereof may be displaced in a direction substantially locally perpendicular to the direction of extension of the second selection menu 506, e.g. the first selection menu may be rendered radially displaced from the center two items of the second selection menu.

FIGS. 6A-6D illustrate an example multi-step application of a command control application. In the context of a command and control selection, a user may utilize the multi-step selection interface to construct a "command sentence." A command sentence may include one or more of an agent, e.g. who or what should perform the command; an action, e.g. what should be performed; an object, e.g. the target of the action; and prepositional constructs, e.g. details of how or where the action should be taken.

The user may utilize the multi-step selection interface to specify each portion of a command sentence and confirm a final selection for execution, as described above. The example provided in FIGS. 6A-6D utilizes a multi-step selection interface to construct at least a portion of a command sentence for tasking a unmanned aerial vehicle (UAV). In an example embodiment, a command sentence may be constructed utilizing a single multi-step selection interface to construct the complete command sentence or a series of multi-step selection interfaces, in which each multi-step selection interface specifies or defines a portion of the command sentence.

FIG. 6A depicts a GUI display area 602 including a map image and a selection initiator 601. In this example, the selection initiator 601 is an agent icon, e.g. UAV. The selection of the selection initiator 601 may cause a rendering of a first selection menu 604 proximate to or substantially in the same position in which the selection initiator was previously rendered. In an instance in which the first selection menu 604 is rendered in substantially the same location in the GUI display area 602 as the selection initiator 601, the selection initiator and in some instances, the display rendering, e.g. map, may be displaced substantially perpendicular to the first selection menu 604 direction of extension. In this example, the first selection menu 604 extends substantially vertically and displacement of the selection initiator 601 may be substantially horizontal.

In the present example the first selection menu 604 includes selection items: "by sensor", "by payload", "by airframe", and "all".

FIG. 6B illustrates the multi-step selection interface of 6A in which selection item 608 "by sensor" has been selected from the first selection menu 604. A second selection menu 606 has been rendered in substantially the same position in the GUI display area 602 which the first selection menu 604 was previously rendered. The first selection menu 604' and the selection initiator 601 have been displaced horizontally to the left, substantially perpendicular to the vertical direction of extension of the second selection menu 606. The second selection menu has been rendered with a center substantially in the position of the selected menu item 608 of the first selection menu 604'. The second selection menu 606 includes section items: "AESA", "Laser TD", "RGB-Video", "SAR", and "SWIR". The non-selected items of the first selection menu 604" have been grayed out.

FIG. 6C illustrates the multi-step selection interface of FIG. 6B in which selection item 612 "SAR" has been selected from the second selection menu 606. A third selection menu 610 has been rendered in substantially the same position in the GUI display area 602 which the second selection menu 606 was previously rendered. The first selection menu 604' the second selection menu 606' and the selection initiator 601 have been displaced horizontally to the left substantially perpendicular to the vertical extension of the third selection menu 610. The center of the third selection menu 610 is substantially rendered in the same position which the selected item 612 of the second selection menu was previously rendered. The third selection menu 610 includes selection items: "Alpha 1", "Alpha 2", "Alpha 3", "Hawk 1", and "Hawk 2".

The previous selected items 608 and 612 may be aligned with the selection initiator 601 to minimize movement away from the perpendicular line in the event the user desires to revisit a previous selection. An execute selector 616 is provided at the end of the third selection menu 610. The execute selector 616 is rendered as grayed out, indicative of being disabled. Alternatively, the execute selector may be rendered in any position on the display such as perpendicular to the selection menu opposite the previous selection menus. In an example embodiment, the execute selector may not be rendered when disabled.

FIG. 6D illustrates the multi-step selection interface of FIG. 6C in which selection items 614 "Alpha 1", "Alpha 2" and "Alpha 3" have been selected from the third selection menu 610'. The selection of selection items 614 may be indicated by highlighting as depicted. The selection of one or more items from the third selection menu 610' may cause the execute selector 616 to be enabled. The user may cause an execute indication to be received by the multi-step selection interface, confirming the selected items, 608, 612, and 614, by interacting with, e.g. touching, clicking or otherwise selecting the execute selector 616.

Example Multi-Step Selection Interface Flow Chart

From a technical perspective, the selection rendering module 44 described above may be used to support some or all of the operations described above. As such, the platform described in FIG. 2 may be used to facilitate the implementation of several computer program and/or network communication based interactions. As an example, FIG. 7 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g. client 20, application server 40, and/or the like) and executed by a processor in the user terminal. As will be appreciated, any such computer program instructions may be loaded onto a computer or other programmable apparatus (e.g. hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention is shown in FIG. 7. The method may be employed for a multi-step selection interface. The method may include, receiving a multi-step selection indication, at operation 702. The method may also include causing a first selection menu extending in a first direction to be rendered on a display, at operation 704. At operation 706, the method may include receiving a first selection indication based on the first selection menu. The method, at operation 708, may include causing a second selection menu to be rendered in substantially the same position of the display as the first selection menu. At operation 710, the method may include causing a rendering of at least a portion of the first selection menu to be displaced in a direction substantially perpendicular to the first direction.

In an example embodiment, the method may optionally include, as denoted by the dashed box, operation 712, receiving a second selection indication. The method may also optionally include enabling an execute selector in response to the second selection indication, at operation 714, and receiving an execute indication, at operation 716.

In an example embodiment, an apparatus for performing the method of FIG. 7 above may comprise a processor (e.g. the processor 52) or processing circuitry configured to perform some or each of the operations (702-716) described above. The processor may, for example, be configured to perform the operations (702-716) by performing hardware implemented logical functions, executing stored instructions, or executing algorithms for performing each of the operations. In some embodiments, the processor or processing circuitry may be further configured for additional operations or optional modifications to operations 702-716. In this regard, for example an order of the first or second selection menu may be based on selection probability of one or more items in the first or second selection menu. In an example embodiment of the method, a high selection probability item may be placed in a substantially center position in the first or second selection menu. In some example embodiments of the method, the first selection menu is rendered with a center located substantially at a first display position based on the multistep selection indication, and the second selection menu is rendered with a center located substantially at second display position based on an item selected from the first menu. In an example embodiment of the method, the first direction is vertical relative to the display. In some example embodiments of the method, the first direction is horizontal relative to the display. In some example embodiments of the method, the first direction is diagonal relative to the display. In an example embodiment of the method, the first direction is an arc extending from a first display edge to a second adjacent display edge.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus configured to implement a multi-step selection interface, the apparatus comprising processing circuitry configured to cause performance of operations including:
   causing a first selection menu extending in a first direction to be rendered on a display, the first selection menu comprising a plurality of first selection menu items;
   receiving, from a user input device, a first selection indication associated with a selected one of the first selection menu items;
   in response to receiving the first selection indication:
      causing a second selection menu to be rendered on the display extending in the first direction, the second selection menu being rendered in the same position of the display as the first selection menu, the second selection menu comprising a plurality of second selection menu items and an execute selector item, wherein the execute selector item is displayed as being unselectable;
      causing the rendering of the first selection menu to be displaced in a direction perpendicular to the first direction;
      causing the plurality of first selection menu items not including the selected one of the first selection menu items to be displayed as non-selected items and differently from the selected one of the first selection menu items;
      receiving, from the user input device, a second selection indication associated with one or more of the second selection menu items; and
      causing the execute selector to be displayed as being selectable in response to receiving the second selection indication;
   wherein an order of the first or second selection menu is based on selection probability of one or more of the first selection menu items or the second selection menu items; and
   wherein a highest selection probability menu item of the first or second selection menu is rendered at a position of a selection pointer based on the selection probability of the menu item.

2. The apparatus of claim 1, wherein the processing circuitry is further configured for:
   receiving an execute indication associated with the execute selector.

3. The apparatus of claim 1, wherein the first direction is vertical relative to the display.

4. The apparatus of claim 1, wherein the first direction is horizontal relative to the display.

5. The apparatus of claim 1, wherein the first direction is diagonal relative to the display.

6. A method for a multistep selection interface including:
   causing, using a processing circuitry, a first selection menu extending in a first direction to be rendered on a display, the first selection menu comprising a plurality of first selection menu items;
   receiving, from a user input device, a first selection indication associated with a selected one of the first selection menu items;
   in response to receiving the first selection indication:
      causing a second selection menu to be rendered on the display extending in the first direction, the second selection menu being rendered in the same position of the display as the first selection menu, the second selection menu comprising a plurality of second selection menu items and an execute selector item, wherein the execute selector item is displayed as being unselectable;
      causing the rendering of the first selection menu to be displaced in a direction perpendicular to the first direction;
      causing the plurality of first selection menu items not including the selected one of the first selection menu items to be displayed as non-selected items and differently from the selected one of the first selection menu items;
      receiving, from the user input device, a second selection indication associated with one or more of the second selection menu items; and
      causing the execute selector to be displayed as being selectable in response to receiving the second selection indication;
   wherein an order of the first or second selection menu is based on a selection probability of one or more of the first selection menu items or the second selection menu items;
   wherein a highest selection probability item is rendered in a substantially center position in the first selection menu or the second selection menu.

7. The method of claim 6 further including receiving an execute indication.

8. The method of claim 6, wherein the first direction is vertical relative to the display.

9. The method of claim 6, wherein the first direction is horizontal relative to the display.

10. The method of claim 6, wherein the first direction is diagonal relative to the display.

11. A method for a multi-step selection interface including:

causing, using a processing circuitry, a first selection menu extending in a first direction to be rendered on a display, the first selection menu comprising a plurality of first selection menu items;

receiving, from a user input device, a first selection indication associated with a selected one of the first selection menu items;

in response to receiving the first selection indication:

causing a second selection menu to be rendered on the display extending in the first direction, the second selection menu being rendered in the same position of the display as the first selection menu, the second selection menu comprising a plurality of second selection menu items and an execute selector item, wherein the execute selector item is displayed as being unselectable;

causing the rendering of the first selection menu to be displaced in a direction perpendicular to the first direction;

causing the plurality of first selection menu items not including the selected one of the first selection menu items to be displayed as non-selected items and differently from the selected one of the first selection menu items;

receiving, from the user input device, a second selection indication associated with one or more of the second selection menu items; and causing the execute selector to be displayed as being selectable in response to receiving the second selection indication;

wherein an order of the second selection menu is based on a selection probability of the plurality of second selection menu items and a highest selection probability menu item of the second selection menu is rendered at a position of a selection pointer based on the selection probability of the menu item.

12. The method of claim 11, wherein causing the plurality of first selection menu items not including the selected one of the first selection menu items to be displayed as non-selected items and differently from the selected one of the first selection menu items includes causing the plurality of first selection menu items not including the selected one of the first selection menu items to be displayed as grayed out.

\* \* \* \* \*